Nov. 10, 1959 A. BACHER 2,912,576
IMPULSE TIMING CHAIN CIRCUITS
Filed April 21, 1954 9 Sheets-Sheet 1

Inventor:
Adolf Bacher
By.

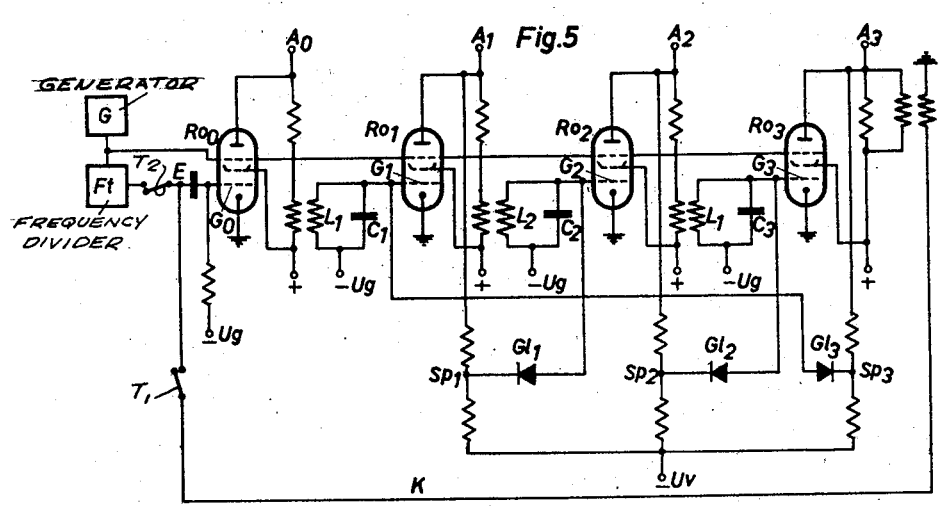
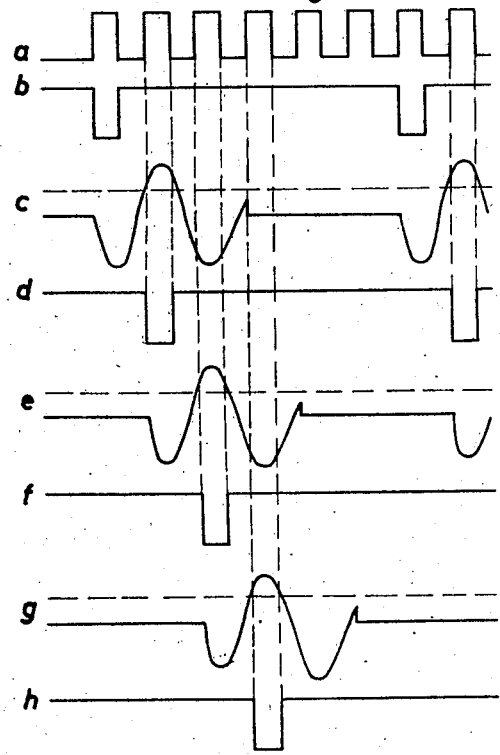

Nov. 10, 1959   A. BACHER   2,912,576
IMPULSE TIMING CHAIN CIRCUITS
Filed April 21, 1954   9 Sheets-Sheet 6

Nov. 10, 1959  A. BACHER  2,912,576
IMPULSE TIMING CHAIN CIRCUITS
Filed April 21, 1954  9 Sheets-Sheet 8

Inventor:
Adolf Bacher
By [signature] Atty.

United States Patent Office 2,912,576
Patented Nov. 10, 1959

2,912,576

IMPULSE TIMING CHAIN CIRCUITS

Adolf Bacher, Munich, Germany, assignor to Siemens & Halske Aktiengesellschaft, Munich, Germany, a corporation of Germany Application April 21, 1954, Serial No. 424,716

Claims priority, application Germany April 29, 1953

27 Claims. (Cl. 250—27)

This invention is concerned with impulse timing chain circuits comprising a plurality of individual stages in which initial impulses supplied to the circuit are delivered at the individual stages as output impulses which are displaced or shifted as to time relative to the initial impulses.

Timing chain circuits are frequently required in electrical signalling systems for the purpose of delaying desired operations and especially the occurrence of signals or impulses. Suitably constructed reactance elements, for example, coil chains are used for this purpose. The initial signals are supplied at the input of such chains and corresponding signals are obtained with certain delays at the output thereof. Such chains also make it possible to obtain signals from terminals associated with the individual chain elements which correspond to those fed to the input but with a certain displacement as to time. However, these arrangements have the drawback of providing for each inductance and capacitance only very short running times for impulses which are to be handled with desired permissible distortion. A considerable expenditure is required so far as individual component elements are concerned if greater impulse running times and small distortion are desired.

The present invention permits construction of a timing chain requiring considerably fewer inductances and capacitances. In accordance with the invention, the individual stages of the timing chain comprise normally blocked amplifier elements which are coupled over oscillating circuits and at which the displaced impulses are obtained. The oscillating circuits are excited with such phase position, by an impulse occurring at the output of a preceding amplifier element, that the succeeding amplifier element remains blocked during the first half wave. The second half wave opens this amplifier element. The time period from stage to stage therefore corresponds approximately to a half cycle of the specific frequency of the oscillating circuits. In order to obtain opening of the succeeding amplifier element only responsive to the second half wave, the oscillating circuits are dampened either inherently or by an impulse derived from a following stage, in such a manner, that from a certain time on, preferably beginning with the end of the second half wave, the succeeding oscillations do not reach the opening potential of the respectively succeeding amplifier element, that is, these oscillations cannot open the corresponding amplifier elements. Discharge tubes, that is, electronic discharge tubes or gas discharge tubes or transistors are used as amplifier elements.

A timing chain of such construction provides relatively long chain intervals with a relatively small expenditure of inductances and capacitances and permits in addition predetermined control of the individual stages whereby distortions of the initial or input impulses, that may be present, may be cancelled, and whereby the chain interval of each impulse may be held at a constant value from stage to stage. The control is effected by means of pulses which are simultaneously conducted to those electrodes of the amplifier elements which are not employed for the control of the oscillating circuits, therefore, especially to the screen grid or the suppressor grid electrodes of the electronic tubes or to switches provided in each stage. The pulse series has such a voltage that the respective amplifier elements or switches can be opened only during the pulse duration. The phase position of the pulse series is such that an initial or input impulse conducted to the timing chain coincides with a pulse of the pulse series. The cycle duration of the pulse series is so adjusted that it coincides at least approximately with the time interval required by an impulse for running from stage to stage. When the pulse duration of this controlling pulse series is adjusted shorter than the time during which the second half wave of the oscillations excited in the oscillation circuits exceeds the opening potential of the respectively following amplifier element, the individual pulses of the pulse series will fall within the corresponding time interval. The opening times of each amplifier element are in this manner definitely determined by the pulses of the control pulse series so that clean-cut rectangular impulses are always obtained at the output of each amplifier element even when distorted impulses are conducted to the timing chain. Inaccurate mutual tuning of the individual oscillating circuits is of no particular consequence because any displacements of the time intervals caused thereby during which the second half wave of the oscillations excited in the oscillating circuits opens the respectively following amplifier element remain without effect so long as the pulses of the control pulse series fall within such time intervals. A certain tolerance is thus obtained for the tuning of the oscillating circuits, thus avoiding requirements as to high accuracy so far as the tuning and the time constants are concerned. The control pulse series holds the running time of the impulses from stage to stage accurately constant.

The output of the last stage may be connected with the input of the first stage over a selectively effective feed back, and an impulse supplied to the timing chain will therefore repeatedly run through the chain responsive to the switching in of the feed back path. The operation requires, however, that the output voltage of the last stage is conducted to the input of the first stage at a value which is sufficient for maintaining the impulse running through the chain. It is of course also possible to connect the feed back to other stages.

Once the feed back path is closed and an impulse is running through the timing chain, the resulting feed back timing chain can in accordance with the invention be used as a generator comprising a plurality of outlets or outputs from which may be obtained an identical pulse series with progressive displacement as to time from stage to stage. If only one impulse runs through the chain, the cycle duration of the corresponding pulse series will be equal to the running time of the impulse from the first to the last stage. A plurality of impulses may of course be fed to such a timing chain but they must be fed at a spacing which is equal to or a multiple of the running time of an impulse from one stage to the next.

The various objects and features of the invention will appear from the descripton of embodiments which will be rendered below with reference to the accompanying diagrammatic drawings. In these drawings, Fig. 1 shows an embodiment of a timing chain circuit comprising pentodes forming the amplifier elements;

Fig. 2 illustrates the operation of the timing chain of Fig. 1;

Fig. 3 indicates a modified embodiment providing for different damping means;

Fig. 5 shows a further embodiment employing different damping means and Fig. 6 indicates the corresponding curves to explain the operation;

Figure 9:
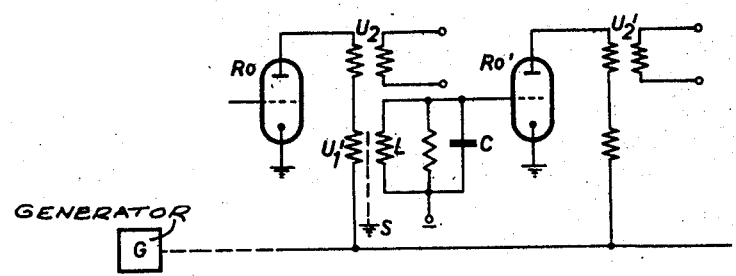
Figure 10:
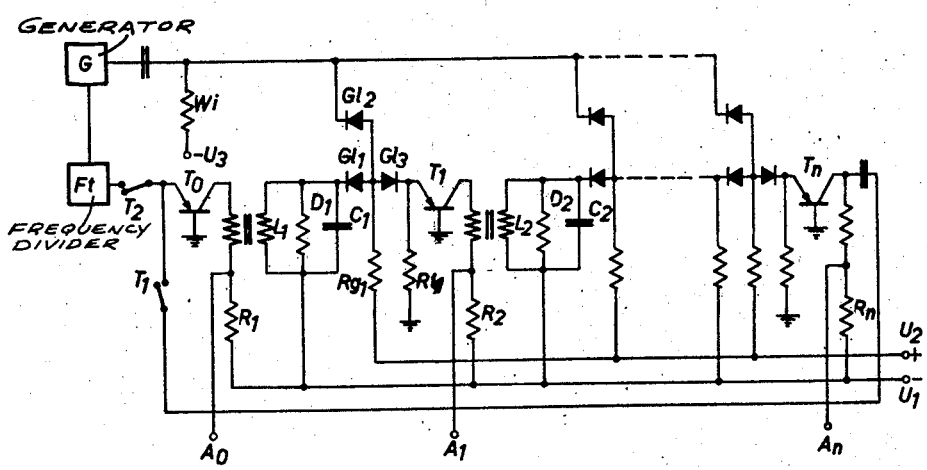
Figure 11:
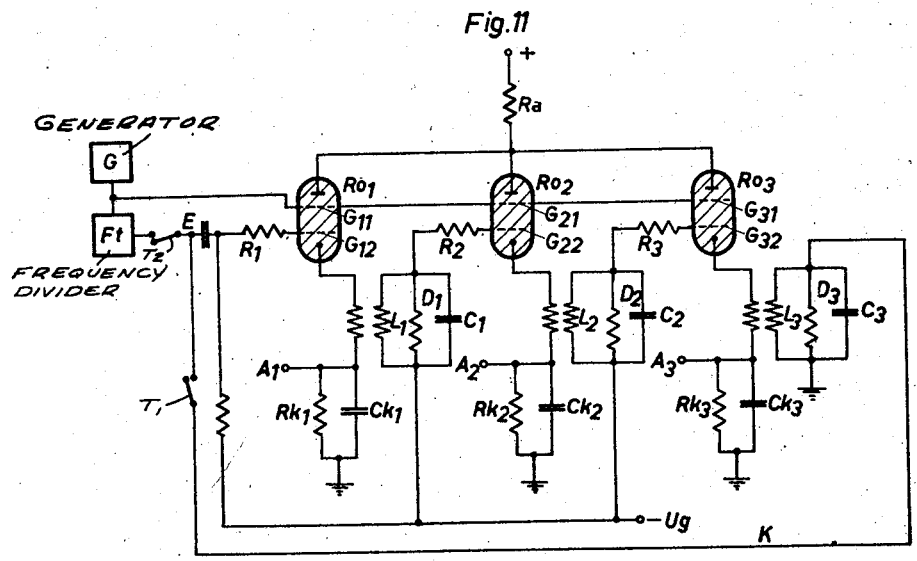
Figure 12:
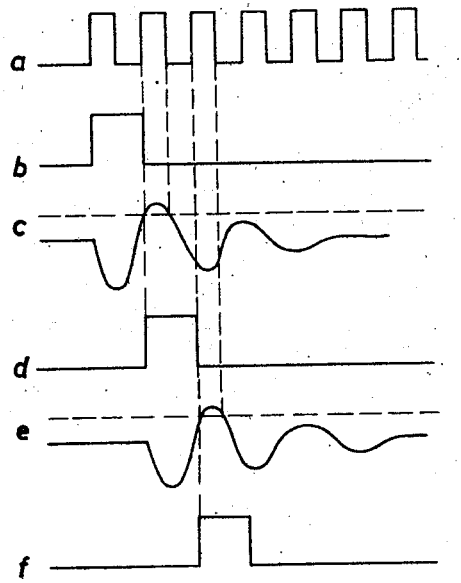
Figure 13:
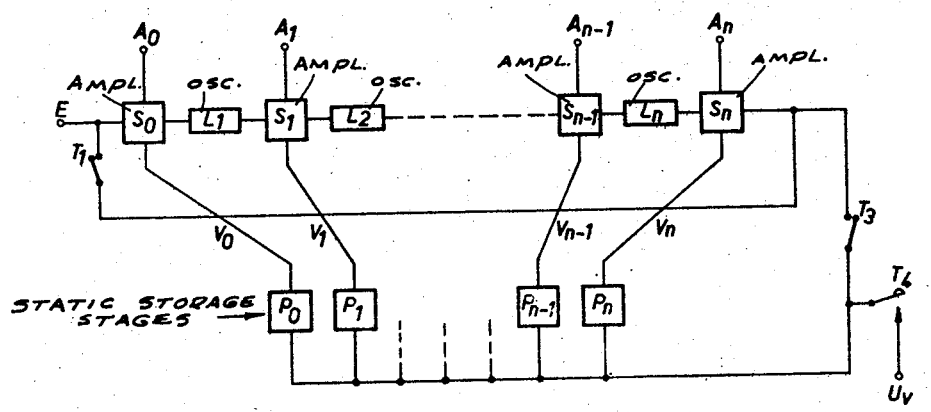
Figure 17:
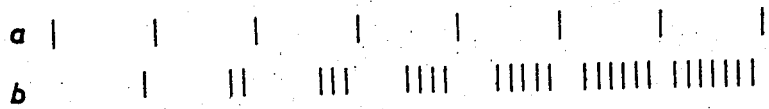
Figure 14:
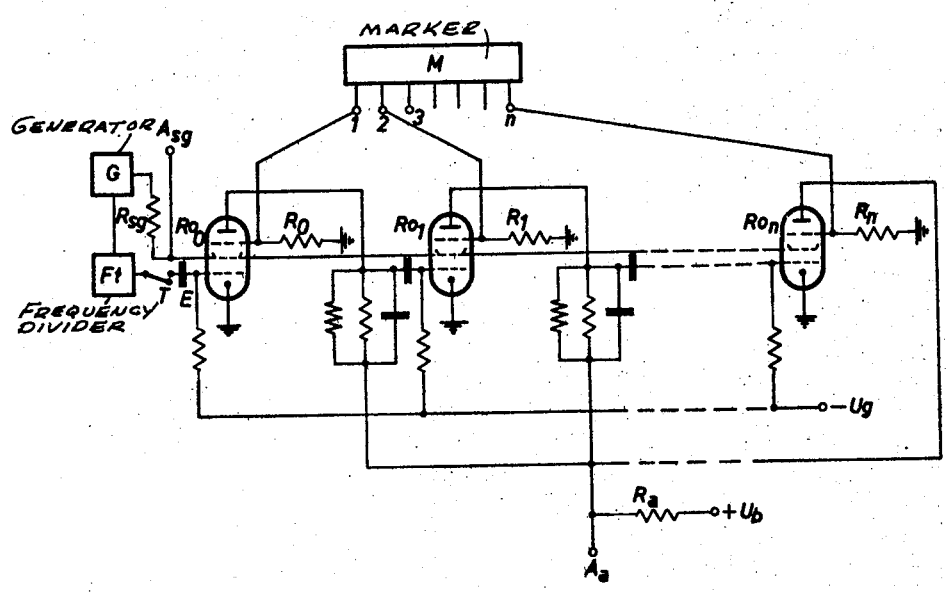
Figure 15:
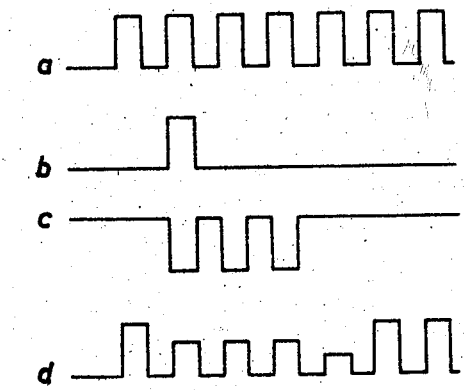
Figure 16:
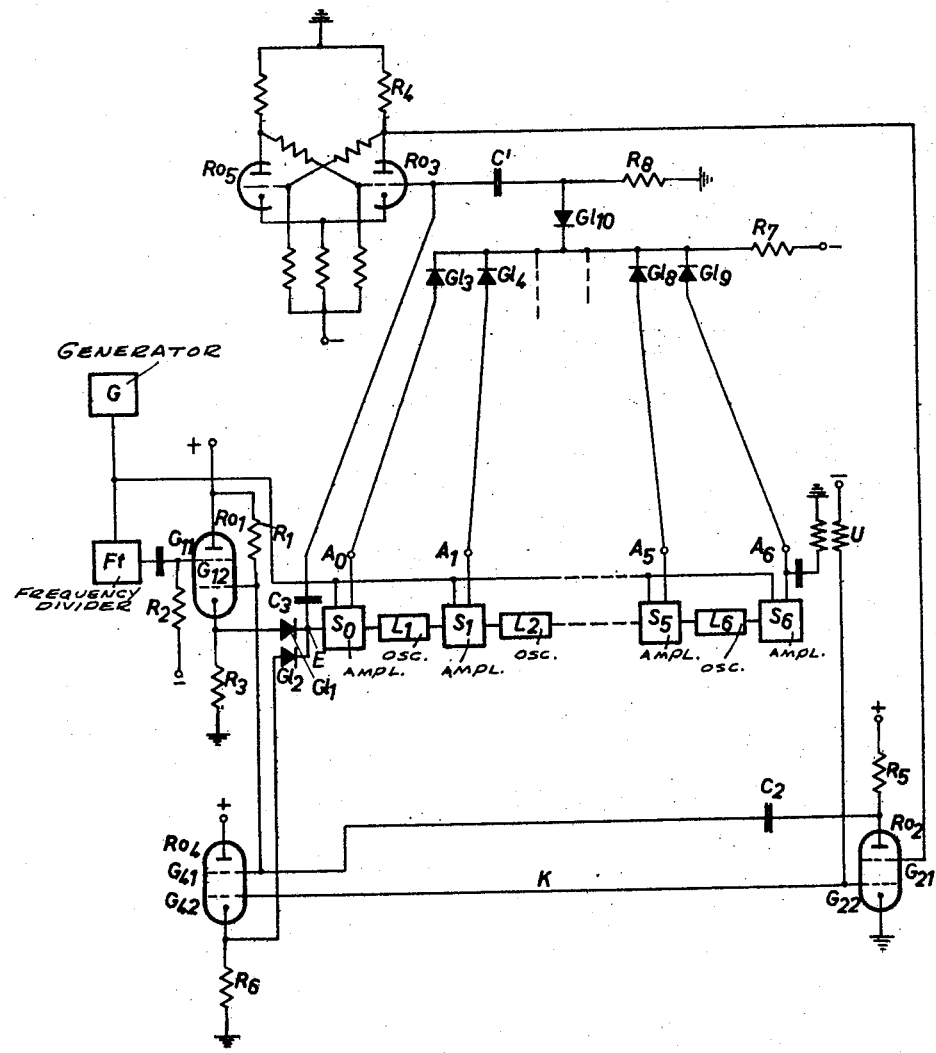

Fig. 9 indicates a modification employing a repeater in the anode circuit of the final stage of a timing chain;

Fig. 10 shows an embodiment of a timing chain employing transistors as amplifier elements;

Fig. 11 illustrates an example of a timing chain employing gas discharge tubes as amplifier elements;

Fig. 12 shows curves to aid in the explanation of the operation of Fig. 11;

Fig. 13 indicates how a timing chain according to the invention may be made by utilizing a static storing device comprising individual stages;

Fig. 14 shows a timing chain combined with a marker;

Fig. 15 represents curves to aid in explaining Fig. 14;

Fig. 16 indicates an embodiment in which the timing chain according to the invention is combined with switching elements to produce repeatedly successive individual impulse groups whose impulse number increases steadily to a final value; and Fig. 17 shows the time relationships of the supplied impulses and the impulses caused by the feed back.

Figure 1:
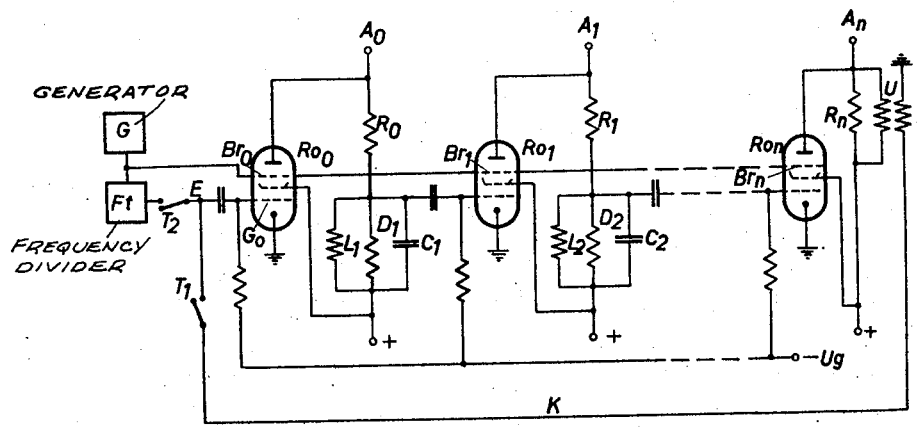

Referring now to Fig. 1, there are provided a number of pentodes $Ro_0$, $Ro_1$ . . . $Ro_n$ forming the amplifier elements. These pentodes are normally blocked by the negative bias $-Ug$ and mutually coupled over the oscillating circuits $L_1C_1$, $L_2C_2$ . . . $L_nC_n$. In parallel with each oscillating circuit is a damping resistor respectively indicated at $D_1$, $D_2$ . . . $D_n$ for damping the respective oscillating circuit so that the opening potential of the respectively following pentode is not reached after occurrence of the second half wave of the oscillation that has been excited. The oscillating circuits are disposed directly in the anode or plate circuits of the respective tubes. In series with each oscillating circuit is a resistor as indicated respectively at $R_0$, $R_1$ . . . $R_n$ and an outlet or output terminal extends from each resistor as indicated respectively at $A_0$, $A_1$ . . . $A_n$. The output voltages with time displacement corresponding to the individual stages are obtained at these terminals.

With the resistor $R_n$, at which appears the output voltage of the tube $Ro_n$, obtained at the terminal $A_n$, is connected the primary winding of a transformer U which delivers at its secondary winding a voltage of different polarity. This voltage is connected over the feed back path K to the input E which is in the illustrated case connected with the control grid $G_0$ of the tube $Ro_0$. The change of polarity is required because negative impulses appear at the output $A_n$ while positive impulses are required for opening the tube $Ro_0$, that is, for making the tube conductive or operatively effective. A switch $T_1$ is disposed in the feed back path K so as to switch it in selectively. An impulse running through the chain is always conducted back to the input E along the feed back path or circuit.

The embodiment according to Fig. 1 also shows the manner in which the restoration of the form of an impulse can be obtained and the manner in which the individual impulse running times are maintained constant from stage to stage by the use of the control impulse series. To the suppressor grids $Br_0$ . . . $Br_n$ of the tubes, which are connected in parallel, is conducted a pulse series produced by the generator G, the pulses being of such voltage that the tubes can open or become conductive only during the duration of the pulses.

A frequency divider Ft is connected with the generator G for delivering a partial pulse series with the individual pulses cophasal with the original pulse series from the generator. This partial pulse series is conducted to the control grid $G_0$ of the first tube $Ro_0$ over the switch $T_2$.

Figure 2:
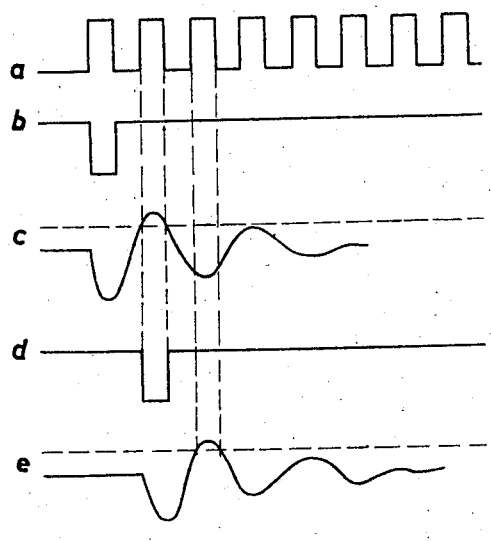

The salient operations occurring in the circuit according to Fig. 1 are schematically indicated in Fig. 2. The pulse series delivered by the generator G is shown at $a$. The curve $b$ represents the output voltage occurring at the output $A_0$. The corresponding output pulse is produced by a pulse obtained from the frequency divider Ft and conducted to the control grid $G_0$. It is not displaced as to time relative to the pulse of the pulse series produced by the generator G and connected to the brake grid $Br_0$ of the tube $Ro_0$, because, as has been said before, the frequency divider delivers pulses in phase with the generator pulses. The output pulse shown below $b$ excites oscillations in the oscillating circuit $L_1C_1$ as illustrated in the curve $c$. The dotted horizontal line represents the opening potential of the next following tube $Ro_1$. As will be apparent, the illustrated dampened oscillation exceeds such potential once. The damping is caused by the damping resistor $D_1$ disposed in parallel to the oscillating circuit $L_1C_1$.

The first half wave of the oscillation has a phase position which blocks the succeeding tube $Ro_1$ while the peak of the second half wave opens such tube. The second pulse (see curve $a$) delivered by the generator falls within this interval. Accordingly, the tube $Ro_1$ opens at the time when these pulses coincide with the opening interval. At the output $A_1$ consequently appears the pulse indicated in curve $d$ of Fig. 2. Such pulse is displaced as to time relative to the pulse $b$ by a whole cycle of the control pulse series.

The above described operations of the oscillating circuit $L_1C_1$ are repeated in the oscillating circuit $L_2C_2$, producing a similar pulse displacement and resulting in the curve shown in Fig. 2 at $e$. Identical operations are caused in the succeeding stages. The initial or feed impulse thus runs through the chain from stage to stage producing at the output of each stage a time displaced signal or impulse.

Figure 3:
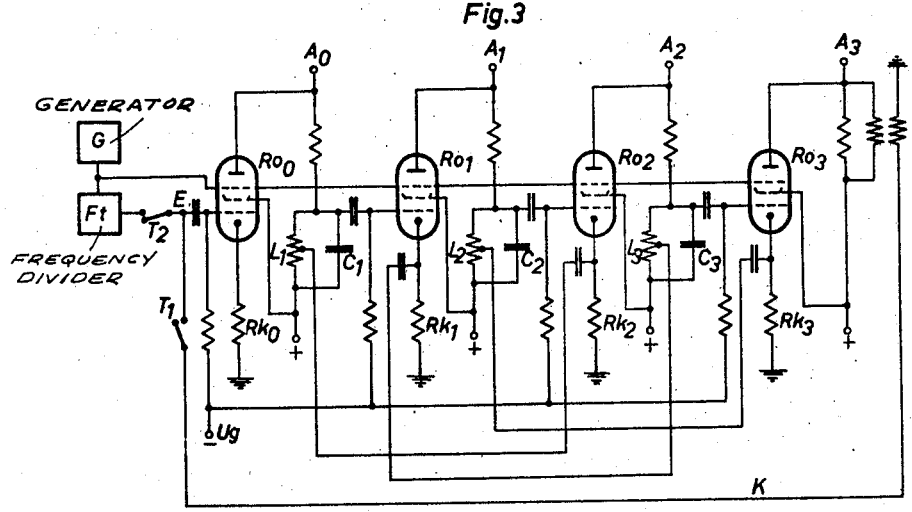

The embodiment according to Fig. 3 utilizes a different type of damping for the oscillation circuits. The amplifier elements are the pentodes $Ro_0$ . . . $Ro_3$ which are mutually coupled over the oscillating circuits $L_1C_1$ . . . $L_3C_3$. Each tube is provided with a cathode resistor as shown respectively at $Rk_0$ . . . $Rk_3$. At the moment of firing or opening of a tube a positive impulse is obtained at the corresponding cathode resistor. This impulse is utilized for the purpose of compensating the energy of an oscillating circuit, which oscillates with suitable phase position, subsequent to the single opening of the successive tube. The compensation impulse is for this purpose conducted to an oscillating circuit whose own oscillations start upon the second negative half wave (following the first positive half wave which opens the successive tube) at the time of the start of the compensating impulse. This phase requirement is satisfied by respectively conducting the compensating impulses to the oscillating circuits which excited the respectively preceding tubes.

Figure 4:
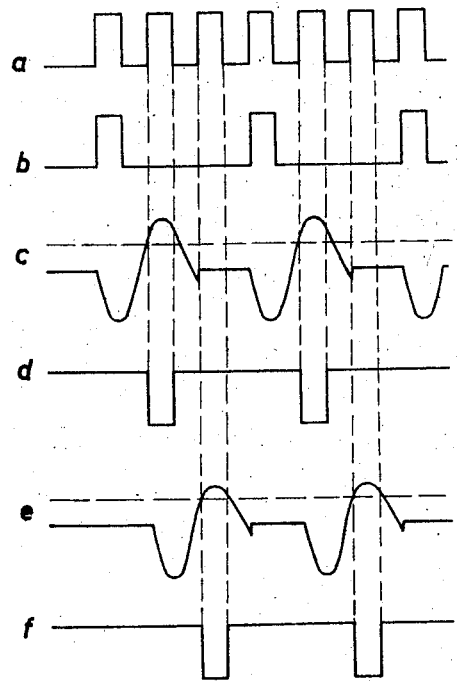
Fig. 4 represents curves to aid in explaining the operations of the timing chain of Fig. 3.

The mutual phase relationships are apparent from Fig. 4. The curve $a$ illustrates again, as in Fig. 2, the pulse series serving for the synchronization, delivered by the generator G, from which are derived over the frequency divider Ft the input pulses conducted to the timing chain. These input pulses are shown in the curve $b$. As will be seen, there is one input impulse $b$ for each third pulse $a$ of the synchronizing pulse series.

The input pulses excite the first oscillating circuit $L_1C_1$ to produce the oscillations $c$ which are in this case for the time being practically undamped oscillations. The pulses shown in curve $d$ are obtained at the output $A_1$. They excite the oscillating circuit $L_2C_2$ to produce the oscillations $e$. The interval when these latter oscillations exceed the opening potential of the tube $Ro_2$ by the second half wave coincides with the start of the third (negative) half wave of the oscillations of the oscillating circuit $L_1C_1$ shown at $c$.

Since there occurs at the cathode resistor $Rk_2$ a positive impulse at the instant of opening of the tube $Ro_2$, it is possible to compensate, by means of such positive impulse, the energy of the oscillating circuit $L_1C_1$ whose oscillations start at such instant on the third (negative) half wave. A connection is for this purpose provided which leads from the cathode resistor $Rk_2$ to the oscillating circuit $L_1C_1$ and over which the compensating pulse is conducted to $L_1C_1$. Its effect is shown in the curve appearing underneath $c$. The third (negative) half wave after the start of the excitation of the oscillating circuit $L_1C_1$ is instantly blocked and this oscillating circuit is thereupon again normal. Attention may be called to the fact that the pulses conducted to the input E follow at a quicker succession as in Figs. 1 and 2 and the exciting operations therefore occur oftener than in Fig. 2c.

The oscillations in the remaining oscillating circuits are correspondingly excited and interrupted. The curve $f$ represents the pulses obtained at the output $A_2$.

The connection from the cathode resistor to the oscillating circuit must skip one stage so as to satisfy the phase requirements explained above. The oscillating circuit $L_2C_2$ is accordingly connected with the cathode resistor $Rk_3$.

For the compensation of the energy of the oscillating circuit $L_3C_3$, there should be provided an additional tube; but since there is no such tube, the compensation pulse is obtained at the cathode resistor $Rk_1$ of the tube $Ro_1$ which corresponds in phase to an additional tube responsive to the switching-in of the feed back path K. It must be considered in this connection that a pulse will occur at the cathode resistor $Rk_1$ at the same instant as it would occur at the additional tube if such tube were provided. This condition will be realized by tracing the circuit closed over the feed back path K. Proceeding from the oscillating circuit $L_3C_3$ to the cathode resistor $Rk_1$, one stage will be skipped, namely, the tube $Ro_3$ or the tube $Ro_0$ with the oscillating circuit $L_1C_1$, respectively. Both tubes are so far as impulse running time is concerned of equal significance and deliver upon switching-in of the feed back path K, at their respective output terminals $A_3$ and $A_0$ an impulse at the same time because they are not coupled over a time element. These two tubes therefore form with the oscillating circuit $L_1C_1$ a single stage. The connection leading to the oscillating circuit is placed on a tap of the coil $L_1$ depending on the strength of the compensating pulse and on the resistance value of the cathode resistor so as to compensate this oscillating circuit fully.

Another, third example of damping of the oscillating circuits is illustrated in the embodiment shown in Fig. 5. Damping resistors are switched over rectifiers in parallel to the oscillating circuits and the rectifiers are for brief intervals opened by pulses of suitable phase position. The operation is as follows:

To the plate of the tube $Ro_3$ is connected a voltage divider $Sp_3$ one terminal of which is connected with a negative bias $-Uv$. Voltage dividers $Sp_1$ and $Sp_2$ are respectively similarly connected to the plates of the tubes $Ro_1$ and $Ro_2$. The tap of the voltage divider $Sp_3$ is connected with the control grid $G_1$ of the tube $Ro_1$ which is disposed two stages ahead of the tube $Ro_3$. The control grid $G_1$ is connected with a negative grid bias $-Ug$. The bias $-Uv$ of the voltage divider $Sp_3$ and the grid bias $-Ug$ are such that the rectifier $Gl_3$ is blocked in the normal resting condition of the arrangement, that is, the tap of the voltage divider $Sp_3$, in the illustrated polarity of the rectifier must be on a higher potential than the grid of the tube $Ro_1$. Now, when the tube $Ro_3$ is opened by a pulse, the potential at its plate and therewith on the tap of the voltage divider $Sp_3$ will drop to the potential of the grid bias $-Ug$. The potential on the control grid $G_1$ will now become more positive than the grid bias $-Ug$, due to the oscillation of the oscillation circuit $L_1C_1$ and the rectifier $Gl_3$ will consequently pass current and will limit the oscillation by damping it by means of the resistor disposed between the tap of the voltage divider $Sp_3$ and the bias potential $-Uv$. Inasmuch as there is no potential differential between the tap of the voltage divider $Sp_3$ and the terminal for the grid bias $-Ug$, during the occurrence of the pulse at the anode of the tube $Ro_3$, the energy of the oscillation circuit is completely dissipated so that no new oscillations can arise in the oscillation circuit $L_1C_1$ after the disappearance of the pulse occurring at the plate of the tube $Ro_3$ and subsequently blocking of the rectifier $Gl_3$. A requirement for this operation is that the resistance of the resistor disposed between the tap of the voltage divider $Sp_3$ and the bias potential $-Uv$ is sufficiently low. The first positive half wave of the oscillations in the oscillation circuit $L_1C_1$ serves for the opening of the tube $Ro_1$ and the damping of this oscillation circuit therefore must start at the latest with the start of the fourth (positive) half wave, so that the tube $Ro_1$ cannot energize a second time. In other words, the pulse occurring on the plate of the tube $Ro_3$ which opens the rectifier $Gl_3$ must coincide with this fourth (positive) half wave of the oscillations in the oscillation circuit $L_1C_1$.

The corresponding phase requirement is actually fulfilled, as will be shown with reference to Fig. 6 which indicates the electrical operations taking place in the circuit Fig. 5. The curve $a$ shows again the control pulse series delivered by the generator G. From this pulse series are derived pulses, over the frequency divider $Ft$, which are conducted to the input E. They cause at the output $A_0$ of the tube $Ro_0$ the pulses shown at $b$. The first pulse arising at the output terminal $A_0$ excites the oscillation circuit $L_1C_1$ to produce the oscillations $c$. The first (positive) half wave of such oscillation opens the tube $Ro_1$ thus producing at its output terminal $A_1$ the pulse shown at $d$. This latter pulse effects the oscillations of the circuit $L_2C_2$ to produce the oscillation shown at $e$.

Identical operations are correspondingly effected in the succeeding stages. The pulse shown in Fig. 6 at $f$ is obtained at the output terminal $A_2$. The oscillations of the oscillating circuit $L_3C_3$ are indicated at $g$. These latter oscillations cause the production of the pulse $h$ which is obtained at the output terminal $A_3$. This pulse produces, just as the pulses occurring at the output terminals $A_1$ and $A_2$, a drop of the potential at the tap of the voltage divider $Sp_3$, making the rectifier $Gl_3$ to pass current at the start of the fourth (positive) half wave of the oscillations of the oscillating circuit $L_1C_1$ shown at $c$. The resistor extending from this tap to the negative bias $-Uv$ is therewith connected in parallel to the oscillating circuit $L_1C_1$ and causes such a strong damping of this oscillating circuit that its oscillations cease immediately. The coincidence of the start of the pulse occurring at the output terminal $A_3$ and the start of the fourth (positive) half wave of the oscillation excited in the oscillating circuit $L_1C_1$ is indicated in Fig. 6 by the vertical dotted line extending from $c$ to $h$.

The phase requirements for the damping of the oscillating circuits are, therefore, satisfied by connecting the tap of the respective voltage divider with the control grid of the tube to the stage lying two stages ahead.

The damping of the other oscillating circuits is effected correspondingly. In order to dampen the oscillating circuit $L_2C_2$, there should be provided an additional tube. However, since the assumed timing chain does not have such an additional tube, the tube $Ro_1$ will take its place. So far as the phase is concerned, the tube $Ro_1$ corresponds to such additional tube after the feed back path K is switched in. Proceeding from the grid $G_2$ in the direction of the impulses running through the chain, two stages will be skipped until arriving at the plate of the tube $Ro_1$. The tubes $Ro_3$ and $Ro_0$ thereby correspond phasially to a single tube because they are coupled directly over the feed back path K without a timing element. The same is true for the damping of the oscillating circuit $L_3C_3$ which is connected with the voltage divider $Sp_2$. This voltage divider is likewise reached during the operation of the timing chain over the feed back coupling path K after skipping two stages.

The oscillating circuits are in the above described example inductively coupled to the preceding tube. Such coupling can of course also be used in the embodiments according to Figs. 2 and 4.

Figure 7:
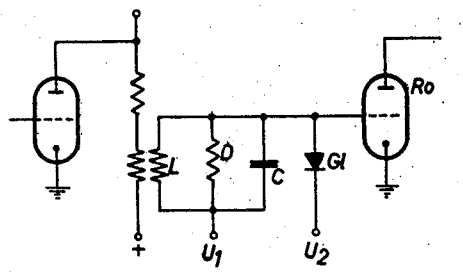
Fig. 7 illustrates another form of damping and Fig. 8 illustrates the corresponding operations.

Fig. 7 shows a further possibility for the damping of the oscillating circuits, providing for a simultaneous limiting of the second (positive) half wave at a certain potential. This is accomplished by a rectifier $Gl$ connected in parallel with the oscillating circuit LC. The rectifier is biased and polarized such that it becomes conductive after the opening potential of the tube $Ro$, connected to the oscillating circuit LC, is exceeded by the second (positive) half wave, the rectifier thus limiting the oscillation exactly at the potential at which it becomes conductive. The necessary bias is supplied by the two voltages $U_1$ and $U_2$.

Figure 8:
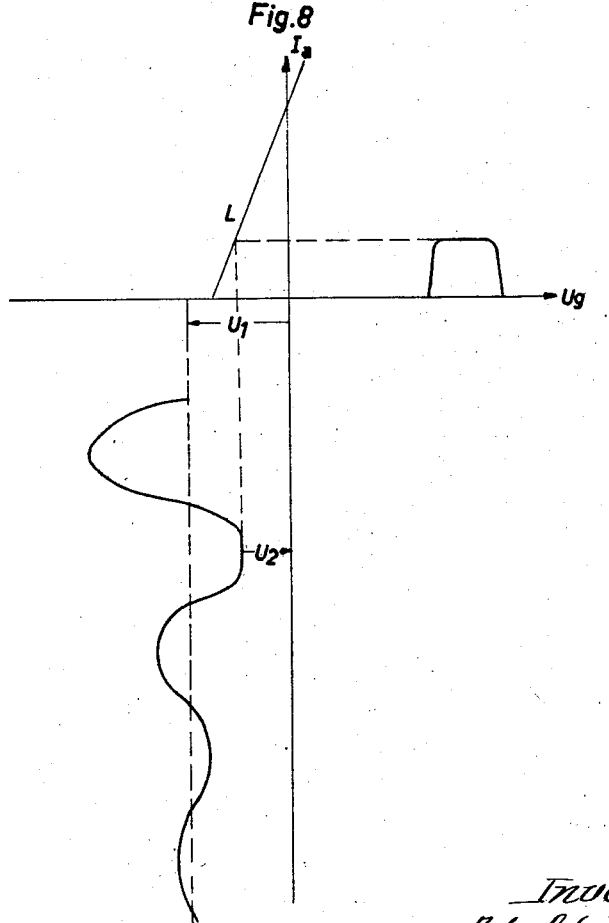

The effect of these voltages and the oscillations superimposed thereon in the oscillation circuit LC is apparent from Fig. 8 which shows schematically the relationship between the anode or plate current $I_a$ and the grid potential $Ug$ of the tube $Ro$ along the line L. The bias $U_1$ connected over the oscillation circuit LC has negative polarity and a magnitude such that the tube $Ro$ is normally blocked. Superimposed on this bias $U_1$ are the oscillations which are excited in the oscillating circuit LC, whose second (positive) half wave exceeds the lower kink of the marker line K which represents the opening potential. After the opening potential is exceeded, this half wave is limited by the action of the rectifier $Gl$. The operation of the rectifier takes place at the instant when the sum of the voltages $U_2$ and the momentary oscillation circuit voltage amounts to a value which equals the voltage $U_1$. $U_2$ thereby has a polarity opposite to that of $U_1$. During the time when the rectifier $Gl$ is conductive, energy will flow from the oscillation circuit LC so that the third half wave following the second (positive) half wave has a considerably lower amplitude than the preceding half wave.

The above described arrangement offers a particular advantage which is seen in the fact that the anode or plate current is held constant during the limiting time by the limiting action of the rectifier. A defined measure is thus obtained for the energy to be conducted to the next oscillating circuit. A requirement for this arrangement resides in a certain basic damping for the oscillation circuit LC so that the fourth (positive) half wave cannot reach the operating or opening potential of the tube $Ro$. This basic damping is obtained in the illustrated example by the provision of the resistor D.

The control pulse series may also be conducted to electrodes other than the screen grid or the suppressor grid electrodes, for example, to the plates or cathodes of the tubes, where the pulse series will likewise operate to make the tubes conductive only for the duration of the individual pulses forming the pulse series.

Fig. 9 shows an example in which the control pulse series delivered by the generator G is conducted to the plates of the triodes $Ro$ and $Ro'$ serving as amplifier elements. The generator pulses have positive polarity. They represent a chopped plate voltage. The consequence of this interrupted plate voltage is that the corresponding tube can be made conductive by a corresponding grid voltage only upon occurrence of a pulse on the plate and that the resulting plate current excites the oscillation circuit LC inductively to produce the damped oscillations. The control pulses alone cannot act either inductively or capacitively on the oscillation circuit LC (only one such oscillation circuit being shown in Fig. 9) because no plate current can flow at the anodes in the absence of a grid potential sufficient for energizing the tubes, in spite of the presence of the pulse on the plates, due to the fact that the two windings of the repeater $U_1$, one of which forms the oscillation circuit coil, are mutually shielded by the screen S.

In the example according to Fig. 9 there is provided a transformer (only transformers $U_2$ and $U_2'$ being shown) in place of the plate or anode resistor of the other embodiments. The transformer makes it possible to obtain output pulses of desired polarity.

The timing chain shown in Fig. 10 employs transistors $T_0 \ldots T_n$ serving as amplifier elements. These transistors amplify the impulses conducted thereto and excite the oscillating circuits $L_1C_1 \ldots L_nC_n$ which are inductively coupled therewith. The output currents of the transistors also flow over corresponding resistors $R_1 \ldots R_n$ at which the output voltage of the respective stages may be obtained over the respectively associated terminals $A_0 \ldots A_n$. Between the oscillating circuits and the transistors are connected rectifier devices serving as switches which are opened in step with the pulses of the control pulse series.

The operation of these switches may be explained with reference to the first rectifier device comprising the rectifiers $Gl_1$, $Gl_2$ and $Gl_3$. In normal condition, there flows a normal current over the rectifiers $Gl_1$ and $Gl_2$, namely, from $+U_2$ over the resistor $Rg_1$, the rectifier $Gl_1$ and inductance $L_1$ to $-U_1$; and in addition from $+U_2$ over the resistor $Rg_1$, rectifier $Gl_2$ and resistor $Wi$ to $-U_3$. The resistors $Rg_1$ and $Wi$ and the ohmic resistance of the inductance $L_1$ are such as to produce at the common point of the three rectifiers a negative potential so that the rectifier $Gl_3$ which leads to ground over the resistor $Rt_1$, that is, to potential 0, is blocked.

As in the previously described embodiments, the oscillating circuits are excited by an output pulse of the preceding amplifier element, the first half wave of the oscillation being of negative polarity. The following positive half wave blocks the rectifier connected to the respective oscillating circuit, in the case of the first oscillating circuit the rectifier $Gl_1$, when the voltage on the oscillating circuit exceeds the potential difference of $+U_2$ to $-U_1$. The blocking of this rectifier $Gl_1$, by itself, does not cause the opening of the rectifier $Gl_3$ because current still flows from $+U_2$ over the resistor $Rg_1$, rectifier $Gl_2$ and resistor $Wi$ to $-U_3$ keeping the potential at the common point of the three rectifiers negative. However, the rectifier $Gl_2$ can be blocked by the pulse series delivered by the generator G because the corresponding pulses have positive polarity. Now, when the blocking of the rectifier $Gl_1$ and of the rectifier $Gl_2$ coincides, the common point of the three rectifiers will become positive and the rectifier $Gl_3$ will pass current. A positive impulse will consequently appear at the resistor $Rt_1$, for the duration of the blocking of the two rectifiers $Gl_1$ and $Gl_2$ to start the operation of the transistor $T_1$.

Similar operations occur in the remaining component parts of the timing chain. The oscillating circuits are damped by the parallel resistors $D_1 \ldots D_n$ etc. so that only the second (positive) half wave of each started oscillation exceeds the potential at which the rectifier respectively associated with the oscillation circuits, in case of the oscillation circuit $L_1C_1$, the rectifier $Gl_1$, is blocked. Fig. 2 may be consulted for the electrical operations taking place in the circuit Fig. 10.

The timing chain shown in Fig. 11 employs gas discharge tubes $Ro_1$, $Ro_2$ and $Ro_3$ serving as amplifier elements. The grid $G_{12}$, $G_{22}$ and $G_{32}$ of these tubes are connected with a blocking potential $-Ug$ which maintains the tubes extinguished. The control pulse series is supplied by a generator G as in the previously described examples. This pulse series is connected to the grids $G_{11}$, $G_{21}$ and $G_{31}$ and also to the frequency divider $Ft$. The latter delivers the partial pulse series which controls the tube $Ro_1$ over the grid $G_{12}$. In order to energize the tubes used in this embodiment there must be a certain voltage on both grids thereof. The tube $Ro_1$ accordingly fires at a time when a pulse of the control pulse series from generator G coincides with a pulse of the partial pulse series from the frequency divider $Ft$ and, by energizing, the tube initiates the operation of the oscillating circuit $L_1C_1$ which is inductively coupled to its cathode circuit.

The above described operations therefore are practically identical with the corresponding operations taking place in the previously described embodiments.

The plate current flowing in the tube $Ro_1$ causes a voltage drop in the cathode resistor $Rk_1$ which appears as the output voltage of the first stage at the output terminal $A_1$. The oscillations started in the oscillating circuit $L_1C_1$ keep the following tube $Ro_2$ extinguished during the first (negative) half wave thereof. However, these oscillations reach with the second (positive) half wave the potential required on the grid $G_{22}$ to fire the tube $Ro_2$. A further pulse of the control pulse series appears at the identical instant on the grid $G_{21}$ and the tube $Ro_2$ accordingly fires. The preceding tube $Ro_1$ is still energized since a gas discharge tube cannot be extinguished merely by control on its grids.

In order to extinguish the tube $Ro_1$ there are provided the common plate resistor $Ra$, the cathode resistors $Rk_1$, $Rk_2$ and $Rk_3$ and the capacitors $Ck_1$, $Ck_2$ and $Ck_3$. Immediately after the tube $Ro_2$ has fired, its operating voltage is between the plates of the tubes and ground because at the moment of firing, the capacitor $Ck_2$ shunts the cathode resistor $Rk_2$. The operating voltage of the tube $Ro_1$ is however only between its plate and cathode. In series therewith is connected the voltage of the charged capacitor $Ck_1$. The voltage lying between the plate and ground drops to the operating voltage immediately upon firing of the tube $Ro_2$. Accordingly, there is due to the effect of the voltage at the capacitor $Ck_1$ only a voltage available for the tube $Ro_1$ which is less than the operating voltage, namely, the difference between operating voltage and capacitor voltage. The tube consequently extinguishes Corresponding operations take place so far as the tubes $Ro_2$ and $Ro_3$ are concerned. An oscillating circuit $L_3C_3$ is coupled with the tube $Ro_3$, differing in this respect from the previously described examples. From this oscillating circuit extends the feed back path K to the input side E of the timing chain. The oscillating circuit $L_3C_3$ is required in order to bring about firing of the tube $Ro_1$, with corresponding displacement as to time, after firing of the tube $Ro_3$ and switching in the feed back path K, and in order to extinguish the tube $Ro_3$ responsive to the firing of the tube $Ro_1$. This was not required in the previously discussed examples which employ electronic tubes because such tubes can be extinguished (blocked) exclusively by grid control. Resistors $R_1$, $R_2$ and $R_3$ are respectively connected in series with the grids $G_{12}$, $G_{22}$ and $G_{32}$ which prevent rise of the grid currents beyond a certain permissible magnitude. Damping resistors $D_1$, $D_2$, $D_3$ are connected in parallel with the oscillating circuits as in the examples described before.

Fig. 12 explains the electrical operations to be considered in the embodiment shown in Fig. 11. The curve $a$ indicates the control pulse series. Curve $b$ represents the voltage at the output terminal $A_1$. The tube $Ro_1$ fires responsive to the first pulse $a$ so that the output voltage appears at the terminal $A_1$. This output voltage excites the oscillation circuit $L_1C_1$ to produce the oscillation according to curve $c$, whose second (positive) half wave exceeds the firing potential (horizontal dotted line) at the grid $G_{22}$. The peak which exceeds the firing potential coincides with the second pulse of the control pulse series and the tube $Ro_2$ accordingly fires causing a breakdown of the voltage lying between the plates and ground to the magnitude of the operating voltage of the tubes. There is consequently insufficient voltage for maintaining the firing of the tube $Ro_1$ and such tube extinguishes. The instant of firing of the tube $Ro_2$ therefore coincides with the instant at which the tube $Ro_1$ extinguishes, as is apparent from Fig. 12. The curve $d$ shows the voltage at the output terminal $A_2$. The curve $e$ indicates the oscillation in the oscillating circuit $L_2C_2$; and $f$ shows the pulse or voltage at the output terminal $A_3$.

The oscillating circuits of the timing chains so far described have been assumed to be tuned to the same frequency. The running time of an impulse from stage to stage therefore is constant within the respective timing chains. A particular effect, namely, production of impulses at the output terminals of the different stages, which are of different width, may however be produced by tuning the oscillation circuits of a timing chain to different frequencies. For example, if the specific frequency of the oscillating circuits decreases from stage to stage, as seen in the direction of running of the impulses, the output impulses will become progressively wider from stage to stage. It is possible to produce in this manner impulse groups with desired duration of the individual impulses which are generated in a timing chain from an initial impulse supplied thereto.

The timing chain according to the invention presents a multitude of possibilities for the use thereof. Aside from producing a delay action in the production of impulses, the chain may be used as a generator for time-displaced impulses by the switching-in of the feed back path.

The feed-back timing chain may furthermore be conceived or considered as a dynamic storage device because the impulses supplied to the input side will run through the chain in predetermined mutual spacing and can be obtained correspondingly at the individual output terminals until the feed back path is disconnected.

The timing chain according to the invention may however also be used with a static storage means comprising several individual stages. Fig. 13 shows such arrangement in simplified block representation. The amplifier elements are designated by $S_0 \ldots S_n$ and the oscillating circuits by $L_1 \ldots L_n$. The kind and combination of the impulses of an impulse group running through the chain can be recognized by the members $P_0 \ldots P_n$ of a static storage device as follows:

Closure of the switch $T_3$ connects the first impulse appearing at the output terminal $A_n$ to all storage stages $P_0 \ldots P_n$. The storage stages may be of known construction comprising known and suitable means for preparing the respective stages for operation responsive to the first impulse received from the timing chain. The stages $P_0 \ldots P_n$ thereupon assume or take over the respectively exciting conditions (opened or blocked) of the individual amplifier elements of the timing chain along circuits including the respective connecting lines $V_0 \ldots V_n$. The storage device thus seizes and retains the entire impulse combination.

The key or switch $T_4$ is actuated if it is desired to bring about the storing at a desired instant. The storage stages $P_0 \ldots P_n$ are thereby connected with the bias $Uv$ which so far as amplitude and polarity are concerned corresponds to an impulse that may be obtained at the last amplifier element $S_n$ of the timing chain. Such impulse prepares the storage stages $P_0 \ldots P_n$ as already described.

The proper operation of the above described arrangement requires that the impulses of the impulse combination to be stored exhibit a spacing which is equal to or a whole multiple of the impulse running time from stage to stage. This requirement also applies to the previously explained dynamic storage.

In accordance with the further embodiment shown in Fig. 14, the timing chain according to the invention may be used together with a marker device M. The timing chain serves in the illustrated arrangement as a generator for a predetermined number of impulses which are selectively utilized by the marker. The latter may be of known and suitable construction. The operation is as follows:

As in the embodiments discussed before, there is a generator G supplying the control pulse series which is in this case conducted to the screen grids of the tubes $Ro_0 \ldots Ro_n$ over the resistor $Rsg$ at an amplitude which suffices for the blocking and preparatory opening of these tubes. This pulse series is indicated in Fig. 15 at $a$. The pulse series is also conducted to the frequency divider $Ft$ which places responsive to operation of the key T a single impulse (impulse $b$ in Fig. 15) on the input E of the timing chain. The impulse runs through the timing chain as described in connection with the embodiments previously referred to and upon each opening of one of the tubes there will appear an impulse at the resistor $R_a$ over which the common operating voltage $Ub$ is connected to the tubes.

The number of these impulses is set by the marker M which has as many outlets as there are tubes. These outlets are respectively connected with the suppressor grids of the tubes, each circuit including a resistor shown at $R_0 \ldots R_n$ which is connected to ground. The marker supplies over its respective outlets 1, 2, 3 ... $n$ a negative bias so high that the tubes are blocked. The marker is so constructed that it permits desired selection of the outlet over which the negative bias is to be conducted to the brake grid of a tube.

If it is for example assumed that such negative bias has been connected by the marker M to its outlet 3 which leads to the suppressor grid of a tube (not shown) similar to the illustrated tubes and for convenience referred to as tube $Ro_3$, and if it is further assumed that an impulse is fed to the input E, such impulse will run through the tubes $Ro_0 \ldots Ro_2$ when it will reach the tube $Ro_3$ which stops further running of the impulse. Accordingly, the tubes $Ro_0$ to $Ro_2$ are successively opened, producing three impulses at the resistor $R_a$ which may be taken off at the terminal $Aa$. These impulses are indicated in Fig. 15 at $c$. They are of negative polarity because the supply voltage $Ub$ is reduced at the instant of opening of the tubes by the voltage drop at the resistor $Ra$.

At the output terminal $Aa$ therefore is obtained a number of impulses which agrees with the numbering of the corresponding outlet of the marker M.

Impulses will also simultaneously appear at the resistor $Rsg$ disposed between the generator G and the screen grids of the tubes. Such impulses which are indicated in Fig. 15 at $d$ may be taken off at the terminal $A_{sg}$ and may be employed for any desired marking operations. So long as all tubes are blocked, no screen grid current will flow and at the terminal $A_{sg}$ will consequently appear the full pulse voltage delivered by the generator G. However, when the tubes $Ro_0 \ldots Ro_2$ are successively opened responsive to an impulse supplied to the input E, a voltage drop will appear on the resistor $R_{sg}$ due to the flow of the screen grid current and the generator pulse voltage will be correspondingly reduced. The impulses shown at $d$ in Fig. 15 which coincide with pulses at the terminal $Aa$ therefore exhibit reduced amplitude.

The conditions are however different so far as the tube $Ro_3$ is concerned which has been blocked by the negative bias delivered over the marker terminal 3. The impulse produced by the tube $Ro_2$ produces, after the delay caused by the arrangement, on the control grid of the tube $Ro_3$ a positive bias enabling this tube to pass current. Such current does not reach the anode due to the negative bias on the brake grid. The entire current emanating from the cathode is therefore effective to the screen grid. The screen grid voltage is thereby reduced by a greater voltage drop on the resistor $Rsg$ than was the case upon opening of the preceding tubes. As a consequence, there will appear at the terminal $A_{sg}$ after the three impulses of identical amplitude a fourth impulse of lesser amplitude, succeeded by pulses corresponding to the full pulse voltage of the generator G.

The example shown in Fig. 16 is concerned with an embodiment in which the timing chain according to the invention is used with switching elements for the purpose of delivering individual impulse groups whose impulse number increases steadily up to a certain end value, such impulse groups being thereupon repeated beginning with the first impulse group. As the embodiment according to Fig. 13, the arrangement is shown in block diagram representation. The amplifier elements of the timing chain are indicated at $S_0 \ldots S_6$ and the oscillating circuits at $L_1 \ldots L_6$. The amplifier elements receive the control pulse series from the generator G and such pulse series is also conducted to the frequency divider $Ft$. The partial pulse series delivered by the frequency divider $Ft$ is on the grid $G_{11}$ of the coincidence tube $Ro_1$ whose second grid $G_{12}$ is biased at about 0 volt since it is connected to the plate voltage over the high ohmic resistor $R_1$. The grid $G_{11}$ is over the resistor $R_2$ at a negative bias which normally blocks the tube $Ro_1$.

An impulse delivered by the frequency divider $Ft$ causes the tube to open, producing at its cathode resistor $R_3$ a positive impulse which is conducted to the input E of the amplifier element $S_0$ over the rectifier $Gl_1$. This first impulse runs through the timing chain and appears finally with negative polarity at the output terminal $A_6$ of the amplifier element $S_6$ in a manner as it appeared, for example, in the embodiment Fig. 1. The repeater U connected with the output $A_6$ reverses the polarity of the impulse so that a positive impulse will appear at the grid of the coincidence tube $Ro_2$ which is connected with the secondary winding of the repeater U. The grid $G_{22}$ is normally negatively biased over the secondary winding of the repeater U. The second grid $G_{21}$ of the tube $Ro_2$ is grounded over the resistor $R_4$ which forms the plate resistor for a tube $Ro_3$ belonging to a trigger circuit which is important for the operations that occur in this state of the arrangement. There will accordingly occur a voltage drop of negative polarity on the resistor $R_4$ which holds the tube $Ro_2$ blocked by way of the grid $G_{21}$. The positive impulse obtained at the repeater therefore cannot open the tube but such impulse also reaches over the feed back path K the grid $G_{42}$ of the coincidence tube $Ro_4$ whose second grid $G_{41}$ is biased at about 0 volt, being just as the grid $G_{12}$ of the tube $Ro_1$ on plate voltage over the resistor $R_1$. The grid $G_{42}$ of the tube $Ro_4$ just like the grid $G_{22}$ of the tube $Ro_2$ is thus normally blocked by the negative bias delivered from the secondary winding of the repeater U. However, the positive impulse on the repeater U opens the tube $Ro_4$ and on the cathode resistor $R_6$ therefore will occur a positive impulse which is conducted to the input E of the amplifier element $S_0$ over the rectifier $Gl_2$. The impulse is thus fed back to the input E. The two rectifiers $Gl_1$ and $Gl_2$ decouple the cathode resistors $R_3$ and $R_6$ and thereby prevent loading of one cathode resistor by the other.

The impulse which is fed back to the input E as above described now runs through the timing chain in the same manner as an impulse connected thereto from the frequency divider $Ft$ over the tube $Ro_1$. The number of stages of the timing chain and the distribution of the frequency divider $Ft$ are such that the feed-back impulse appears at the input E at an instant different from that at which a new impulse from the frequency divider $Ft$ would appear thereon, but the feed-back impulse coincides with a pulse of the control pulse series.

Fig. 17 shows the time relationships with respect to the impulses delivered by the frequency divider $Ft$ and the feed-back impulses. At $a$ are indicated the impulses delivered by the frequency divider $Ft$ and at $b$ are indicated the feed-back impulses. The first impulse delivered by the frequency divider $Ft$ causes in the illustrated example production of a feed-back impulse which appears at the input E ahead of the second impulse delivered by the frequency divider $Ft$ by an amount corresponding to one cycle of the control impulse series. These two impulses now cause production of two similarly spaced feed-back impulses, the second of these two impulses again leading the third impulse from the frequency divider by a similar amount. There are therefore in this phase of the operation three impulses at the input side E which in turn cause production of three feed-back impulses to which is added the fourth impulse from the frequency divider.

The operation continues in this manner, the number of impulses running through the timing chain increasing steadily until it equals, in the assumed example, the number of available amplifier elements. The delivery of impulses from the frequency divider Ft is from this moment on blocked until all impulses have run through the chain when the chain is again prepared for receiving impulses. This operation will be apparent from the following considerations.

When all the amplifier elements have become conductive, the potential at the output terminals $A_0 \ldots A_6$ (Fig. 16) drops, it being assumed that the circuit of the amplifier elements $S_0 \ldots S_6$ corresponds to one of the previously described embodiments, for example, to that illustrated in Fig. 1. The rectifiers $Gl_3 \ldots Gl_9$ accordingly become nonconductive, assuming of course proper bias potentials therefor. So long as one of these rectifiers is conductive, there flows a current over the resistor $R_7$ to the negative terminal producing a positive potential on the conductor which is common to the rectifiers, and such positive potential blocks the rectifier $Gl_{10}$. When all amplifier elements become conductive, this current flow is interrupted by the blocking of the rectifiers $Gl_3 \ldots Gl_9$ and the negative bias over the resistor $R_7$ is on the common conductor so that the rectifier $Gl_{10}$ becomes conductive producing a negative potential on the resistor $R_8$. This negative potential is conducted to the grid of the tube $Ro_3$ over the coupling capacitor $C'$ which serves to block the flow of direct current, and the tube $Ro_3$ therefore becomes blocked and ceases to pass current.

The tube $Ro_3$ is part of a known trigger device also comprising the tube $Ro_5$. When the tube $Ro_3$ becomes blocked, its plate potential increases causing an increase in the potential on the grid of the tube $Ro_5$. The latter tube becomes conductive and by coupling the plate potential to the grid of the tube $Ro_3$ maintains such tube in blocked condition. The plate of tube $Ro_3$ accordingly assumes ground potential which is conducted to the grid $G_{21}$ of the tube $Ro_2$ thus preparing such tube for operation. The impulse occurring on the output terminal $A_6$ is at the same time conducted over the repeater U to the grid $G_{22}$ of the tube $Ro_2$ which passes current and thus produces a negative impulse on its plate resistor $R_5$. This negative impulse is conducted over the capacitor $C_2$ to the grid $G_{41}$ of the tube $Ro_4$ and also to the grid $G_{12}$ of the tube $Ro_1$.

The tubes $Ro_4$ and $Ro_1$ are thus blocked for the duration of the impulse on the output terminal $A_6$. The impulse delivered at identical instants by the frequency divider Ft consequently cannot reach the chain input E and the feed back path K is blocked over the tube $Ro_4$. The timing chain is thereby freed of extraneous effects until all impulses contained therein are processed by running through it.

The blocking of the tubes $Ro_4$ and $Ro_1$ ceases after the last impulse has appeared on the output terminal $A_6$ and the next impulse delivered by the frequency divider Ft can again reach the chain input E. This next impulse, being the first of another series has, as all impulses supplied to the input, positive polarity and is also conducted to the grid of the tube $Ro_3$ over the capacitor $C_3$. The tube $Ro_3$ is thus made conductive and is held conductive by the associated trigger circuit. The positive impulses now successively conducted to the input E do not affect this condition.

The energization of the tube $Ro_3$ again blocks the tube $Ro_2$ by affecting the grid $G_{21}$ thus restoring the initial condition. The previously described impulse processing operations are now repeated.

As will be apparent, the timing chain according to the invention is very versatile and applicable in many circumstances, especially in cases in which desired marking or calculating operations are to be carried out. Only a few examples of using the timing chain have been mentioned, but it is understood that the chain according to the invention is not limited to such specific examples.

What is believed to be new and desired to have protected by Letters Patent is defined in the appended claims.

I claim:

1. Impulse timing apparatus having a timing chain comprising a plurality of serially related timing stages each comprising a normally blocked amplifier element, input means for conducting to said timing chain initial impulses to be timed thereby, output means respectively associated with said amplifier elements for respectively delivering for each initial impulse a timed impulse exhibiting a time displacement relative to the corresponding initial impulse, oscillating circuits for coupling said amplifier elements over predetermined electrodes thereof, each oscillating circuit being excited by a timed impulse delivered by a preceding amplifier element to produce an oscillation with a phase position such that the first half wave blocks the succeeding amplifier element while the second half wave causes for a time interval corresponding to a major part of such half wave operative actuation thereof, means for delivering a control pulse series having a voltage and phase position permitting operative actuation of said amplifier elements solely during the time of occurrence of a control pulse which is delivered to said amplifier elements coincidentally with an initial impulse over predetermined other electrodes thereof, the cycle duration of said control pulse series corresponding at least approximately to the running time of an impulse from stage to stage of said timing chain and respective damping means operatively connected with each oscillating circuit to dampen the oscillations thereof following the second half wave to inhibit the operative actuation of the succeeding amplifier element by a following second half wave of such oscillations.

2. The apparatus defined in claim 1, wherein said damping is effected by an impulse derived from a succeeding stage of said chain.

3. The apparatus defined in claim 1, wherein said oscillating circuits are tuned to identical frequency.

4. The apparatus defined in claim 1, wherein said oscillating circuits are tuned to different frequencies.

5. The apparatus defined in claim 1, comprising switching means, and circuit means for delivering said control pulse series to said switching means.

6. The apparatus defined in claim 1, comprising electronic tubes constituting said amplifier elements, and circuit means for delivering said control pulse series to primary electrodes of said tubes functioning respectively in the nature of anodes or cathodes.

7. The apparatus defined in claim 1, having amplifier elements comprising electrodes connected in parallel, and circuit means for delivering said control pulse series to said electrodes.

8. The apparatus defined in claim 1, comprising a feed back circuit extending from the output of a desired stage to the input of another desired stage for feeding timed impulses occurring at the corresponding output back for retiming through the portion of the timing chain extending between the stages coupled by said feed back circuit.

9. The apparatus defined in claim 8, comprising switching means for selectively connecting said feed back circuit.

10. The apparatus defined in claim 1, comprising electronic tubes constituting said amplifier elements.

11. The apparatus defined in claim 1, comprising gas discharge tubes constituting said amplifier elements.

12. The apparatus defined in claim 1, comprising transistors constituting said amplifier elements.

13. The apparatus defined in claim 1, comprising transistors forming part of said amplifier elements.

14. The apparatus defined in claim 1, comprising rectifier means respectively associated with said stages, circuit means for connecting said rectifier means in each stage respectively with the output circuit of a preceding amplifier stage and a control circuit of the succeeding amplifier stage for the purpose of delivering to said rectifiers a control pulse series and timed impulses occurring at the output of said stages, the transmission of a timed impulse to a succeeding stage depending on the coincidence thereof with a pulse of said control pulse series.

15. The apparatus defined in claim 1, comprising a resistor in parallel with each oscillating circuit for damping such circuit.

16. The apparatus defined in claim 1, comprising a rectifier connected in parallel with each oscillating circuit, and means for respectively biasing and polarizing said rectifier to cause current flow therethrough when the second half wave of the oscillation of the respectively associated oscillating circuit exceeds the energizing potential of the amplifier element successively disposed in said timing chain.

17. The apparatus defined in claim 1, comprising a resistor disposed between adjacent amplifier elements and the oscillating circuit respectively associated therewith, and terminal means for said resistor for receiving the respective timed impulses produced by said amplifier elements.

18. The apparatus defined in claim 1, comprising a transformer having a primary and a secondary winding disposed between adjacent amplifier elements and the oscillating circuit respectively associated therewith for delivering at its secondary winding timed impulses at desired polarity.

19. The apparatus defined in claim 1, for use as an impulse generator, comprising separate output means for delivering timed impulses produced by said timing chain.

20. The apparatus defined in claim 19, comprising discharge tubes constituting said amplifier elements, a marker device having a plurality of outlets and means for selectively electrically marking said outlets, there being outlets corresponding in number to the number of tubes in said timing chain, circuit means for connecting each outlet with the brake grid of one of said tubes, one of said outlets carrying a negative bias for the respectively connected brake grid of the associated tube which is sufficiently high to cause the corresponding brake grid to block the anode current in the associated tube, a current source, a resistor extending from said source, and a common output terminal connected with said resistor, all said tubes being placed on said current source over said resistor responsive to the blocking of the anode current of the corresponding tube for the purpose of delivering the timed impulses at said common output terminal, the number of said timed impulses being determined by the electrically marked outlets of said marker device.

21. The apparatus defined in claim 1, for use as a dynamic impulse storing device for said initial impulses, comprising a feed back circuit extending from the output of a desired timing stage back to the input of another desired stage for conducting to the latter stage timed impulses produced in the former stage, said feed-back impulses running through the stages coupled by said feed back circuit, and means for receiving timed impulses from said coupled stages.

22. The apparatus defined in claim 1, for use as a storage device for impulse groups, comprising a plurality of storage elements, circuit means for individually controlling said storage elements by the respective amplifier elements, said storage elements being adapted to ascertain the momentary condition of the respectively associated amplifier elements, the timed impulse occurring from an initial impulse at a desired timing stage of said timing chain being effective to condition said storage elements for receiving impulses from said timing chain for the storage thereof.

23. The apparatus defined in claim 1, for use as a generator for generating individual successively effective impulse groups with progressively increasing numbers of impulses, comprising a source for producing primary impulses, a frequency divider, circuit means for conducting primary impulses from said source to the input of said timing chain and to said frequency divider, respectively, said frequency divider producing secondary impulses for delivery to said timing chain, a feed back circuit extending from the output of a desired timing stage to the input of said chain for conducting timed impulses from said desired stage back to the input of the chain for retiming such timed impulses, the number of timing stages of said chain and the divisor ratio of said frequency divider being such that any timed impulse conducted back to the input of said chain arrives at such input at a different instant than one of said secondary impulses from said frequency divider but coinciding with a primary impulse from said generator, switching means disposed in said feed back circuit, and circuit means depending on the operating condition of the amplifier elements in said timing chain for blocking said switching means at a predetermined instant of the operation thereof until such a time when all impulses contained in said chain have run therethrough.

24. The apparatus defined in claim 23, wherein the number of timing stages of said chain and the divisor ratio of said frequency divider are such that the running time of an impulse through the chain is shorter by one cycle of the pulse sequence of the secondary impulses delivered by said frequency divider.

25. Impulse timing apparatus having a timing chain comprising a plurality of serially related timing stages each comprising a normally blocked amplifier element, input means for conducting to said timing chain initial impulses to be timed thereby, output means respectively associated with said amplifier elements for respectively delivering for each initial impulse a timed impulse exhibiting a time displacement relative to the corresponding initial impulse, oscillating circuits for coupling said amplifier elements over predetermined electrodes thereof, each oscillating circuit being excited by a timed impulse delivered by a preceding amplifier element to produce an oscillation with a phase position such that the first half wave blocks the succeeding amplifier element while the second half wave causes for a time interval corresponding to a major part of said half wave operative actuation thereof, means for delivering a control pulse series having a voltage and phase position permitting operative actuation of said amplifier elements solely during the time of occurrence of a control pulse which is delivered to said amplifier elements coincidentally with an initial impulse over predetermined other electrodes thereof, the cycle duration of said control pulse series corresponding at least approximately to the running time of an impulse from stage to stage of said timing chain, and damping means effective at a predetermined instant of the operation of said chain for inhibiting the operative actuation of said amplifier elements by the oscillations of said oscillating circuits; a generator for producing said control pulse series, a frequency divider, circuit means for conducting said pulse series from said generator to said predetermined electrodes of said amplifier elements and to said frequency divider, respectively, said frequency divider delivering a partial control impulse series in phase with the pulse series produced by said generator, and selectively operable switching means for conducting said partial control impulse series to the input of the first stage of said timing chain.

26. Impulse timing apparatus having a timing chain comprising a plurality of serially related timing stages each comprising a normally blocked amplifier element, input means for conducting to said timing chain initial impulses to be timed thereby, output means respectively associated with said amplifier elements for respectively delivering for each initial impulse a timed impulse exhibiting a time displacement relative to the corresponding initial impulse, oscillating circuits for coupling said amplifier elements over predetermined electrodes thereof, each oscillating circuit being excited by a timed impulse delivered by a preceding amplifier element to produce an oscillation with a phase position such that the first half wave blocks the succeeding amplifier element while the second half wave causes for a time interval corresponding to a major part of said half wave operative actuation thereof, means for delivering a control pulse series having a voltage and phase position permitting operative actuation of said amplifier elements solely during the time of occurrence of a control pulse which is delivered to said amplifier elements coincidentally with an initial impulse over predeteremined other electrodes thereof, the cycle duration of said control pulse series corresponding at least approximately to the running time of an impulse from stage to stage of said timing chain, and damping means effective at a predetermined instant of the operation of said chain for inhibiting the operative actuation of said amplifier elements by the oscillations of said oscillating circuits; discharge tubes constituting said amplifier elements, a voltage divider disposed between the anode of a tube in a certain stage and a negative bias source, a rectifier connected with said voltage divider, circuit means for connecting said rectifier with a control grid of a tube disposed two stages preceding said certain stage, and a bias for said control grid for blocking said rectifier during the time when the tube connected therewith is blocked, said blocked rectifier passing current responsive to operative actuation of the associated tube, whereby the oscillation of an oscillating circuit associated with one of said tubes is inhibited by the damping effected by a resistor forming part of said voltage divider.

27. Impulse timing apparatus having a timing chain comprising a plurality of serially related timing stages each comprising a normally blocked amplifier element, input means for conducting to said timing chain initial impulses to be timed thereby, output means respectively associated with said amplifier elements for respectively delivering for each initial impulse a timed impulse exhibiting a time displacement relative to the corresponding initial impulse, oscillating circuits for coupling said amplifier elements over predetermined electrodes thereof, each oscillating circuit being excited by a timed impulse delivered by a preceding amplifier element to produce an oscillation with a phase position such that the first half wave blocks the succeeding amplifier element while the second half wave causes for a time interval corresponding to a major part of such half wave operative actuation thereof, means for delivering a control pulse series having a voltage and phase position permitting operative actuation of said amplifier elements solely during the time of occurrence of a control pulse which is delivered to said amplifier elements coincidentally with an initial impulse over predetermined other electrodes thereof, the cycle duration of said control pulse series corresponding at least approximately to the running time of an impulse from stage to stage of said timing chain, and damping means effective at a predetermined instant of the operation of said chain for inhibiting the operative actuation of said amplifier elements by the oscillations of said oscillating circuits, said amplifier elements comprising discharge tubes, a positive impulse occurring on said resistors responsive to operative actuation of the respectively associated tube, and circuit means for conducting the positive impulse occurring on a resistor to the oscillating circuit which controls the tube preceding the tube associated with such resistor so as to compensate the energy of said oscillating circuit.

References Cited in the file of this patent

UNITED STATES PATENTS

| | | |
|---|---|---|
| 2,076,335 | Dallenbach | Apr. 6, 1937 |
| 2,210,574 | Fitch | Aug. 5, 1940 |
| 2,442,769 | Kenyon | June 8, 1948 |
| 2,447,082 | Miller | Aug. 17, 1948 |
| 2,594,336 | Mohr | Apr. 29, 1952 |
| 2,600,268 | Sagalyn | June 10, 1952 |
| 2,654,028 | Levy | Sept. 29, 1953 |
| 2,721,265 | Rothman et al. | Oct. 18, 1955 |